(12) United States Patent
Xu et al.

(10) Patent No.: US 12,466,062 B2
(45) Date of Patent: Nov. 11, 2025

(54) CONTROL METHOD, APPARATUS, AND SYSTEM OF A COMPOSITE ROBOT

(71) Applicant: JAKA ROBOTICS CO., LTD., Shanghai (CN)

(72) Inventors: Xiong Xu, Shanghai (CN); Bofeng Liu, Shanghai (CN); Zhenxiang Qi, Shanghai (CN); Fan Yang, Shanghai (CN); Mingyang Li, Shanghai (CN); Jiapeng Wang, Shanghai (CN)

(73) Assignee: JAKA ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 18/036,779

(22) PCT Filed: Aug. 9, 2022

(86) PCT No.: PCT/CN2022/111062
§ 371 (c)(1),
(2) Date: May 12, 2023

(87) PCT Pub. No.: WO2023/065781
PCT Pub. Date: Apr. 27, 2023

(65) Prior Publication Data
US 2024/0017407 A1   Jan. 18, 2024

(30) Foreign Application Priority Data

Oct. 18, 2021   (CN) .......................... 202111209630.6

(51) Int. Cl.
*B25J 9/16*   (2006.01)
*A61H 7/00*   (2006.01)
(Continued)

(52) U.S. Cl.
CPC ............ *B25J 9/1633* (2013.01); *A61H 7/004* (2013.01); *B25J 5/02* (2013.01); *B25J 13/085* (2013.01);
(Continued)

(58) Field of Classification Search
CPC . B25J 9/1633; B25J 13/085; B25J 5/02; B25J 5/007; B25J 9/162; B25J 9/1015;
(Continued)

(56) References Cited

U.S. PATENT DOCUMENTS 6,430,473 B1 *   8/2002   Lee .................. B25J 13/025
318/568.22
2003/0220714 A1 *   11/2003   Nakamura ............ G06T 13/40
700/69
(Continued)

FOREIGN PATENT DOCUMENTS

CN   103240739 A   8/2013
CN   106420257 A   2/2017
(Continued)

OTHER PUBLICATIONS

European Search Report for Application No. 22871098.4 dated Nov. 11, 2024 (13 pgs).
(Continued)

*Primary Examiner* — Khoi H Tran
*Assistant Examiner* — Tanner L Cullen
(74) *Attorney, Agent, or Firm* — ArentFox Schiff LLP; Joseph M. Maraia

(57) ABSTRACT

A control method of the composite robot includes acquiring multiple forces and multiple torques collected by the force sensor in the current motion when the robot arm is pulled to move; calculating multiple displacement value sets according to the multiple forces, the multiple torques, a preset desired force, a preset desired torque, and a preset model;
(Continued)

calculating the optimal solution according to the multiple displacement value sets to obtain a first target displacement value corresponding to the robot arm and a second target displacement value corresponding to the motion mechanism; controlling the robot arm and the motion mechanism to move according to the first target displacement value and the second target displacement value; and repeating the operation of acquiring multiple forces and multiple torques collected by the force sensor in the current motion until the robot arm and the motion mechanism stop moving.

17 Claims, 3 Drawing Sheets

(51) Int. Cl.
*B25J 5/02* (2006.01)
*B25J 13/08* (2006.01)

(52) U.S. Cl.
CPC .............. *A61H 2201/1659* (2013.01); *A61H 2201/5061* (2013.01)

(58) Field of Classification Search
CPC ............ B25J 5/04; G05B 2219/39339; G05B 2219/40298; G05B 2219/39172
See application file for complete search history.

(56) References Cited

U.S. PATENT DOCUMENTS

| | | | |
|---|---|---|---|
| 2011/0029133 A1* | 2/2011 | Okazaki | B25J 9/142 700/258 |
| 2013/0253702 A1* | 9/2013 | Lecours | B25J 9/163 700/250 |
| 2017/0266077 A1* | 9/2017 | Mackin | A61G 13/1235 |
| 2018/0314265 A1* | 11/2018 | Matsuno | G05D 1/0246 |
| 2019/0009410 A1* | 1/2019 | Radrich | B25J 9/1638 |
| 2020/0306964 A1 | 10/2020 | Neville et al. | |
| 2021/0387334 A1* | 12/2021 | Ren | B25J 13/089 |

FOREIGN PATENT DOCUMENTS

| | | | |
|---|---|---|---|
| CN | 108000477 A | 5/2018 | |
| CN | 109397244 A | 3/2019 | |
| CN | 111230867 A * | 6/2020 | ............. B25J 13/00 |
| CN | 111376263 A | 7/2020 | |
| CN | 111870288 A | 11/2020 | |
| CN | 112157659 A | 1/2021 | |
| CN | 112497208 A | 3/2021 | |
| CN | 113305838 A | 8/2021 | |
| CN | 113843801 A | 12/2021 | |
| JP | H06285776 A | 10/1994 | |
| JP | 2013158837 A | 8/2013 | |
| WO | 2020/084171 A1 | 4/2020 | |
| WO | 2021/033315 A1 | 2/2021 | |
| WO | 2021/050232 A1 | 3/2021 | |

OTHER PUBLICATIONS

Agravante et al: "Collaborative human-humanoid carrying using vision and haptic sensing", 2014 IEEE International Conference on Robotics and Automation (ICRA), IEEE May 31, 2014 (May 31, 2014), pp. 607-612, XP032650894, DOI: 10.1109/ICRA.2014. 6906917.

Dietrich et al: "Whole-body impedance control of wheeled mobile manipulators", Autonomous Robots, Kluwer Academic Publishers, Dordrecht, NL, vol. 40, No. 3, May 26, 2015 (May 26, 2015), pp. 505-517, XP035822418, ISSN: 0929-5593, DOI: 10.1007/S10614-015-9438-Z.

Xing et al: "An admittance-controlled wheeled mobile manipulator for mobility assistance: Human-robot interaction estimation and redundancy resolution for enhanced force exertion ability", Mechatronics, vol. 74, Apr. 1, 2021 (Apr. 1, 2021), pp. 1-11, XP093216052, GB ISSN: 0957-4158, DOI: 10.1016/j.mechatronics. 2021. 102497.

Kuka—Robots & Automation: "the Finalists of the KUKA Innovation Award 2019: Team iYU Pro, robot for personalized massages", Nov. 18, 2019 (Nov. 18, 2019), XP093216474.

International Search Report from corresponding PCT Application No. PCT/CN2022/111062 mailed Oct. 14, 2022.

Office Action for related JP Application No. 2023-533806 dated Mar. 5, 2024 (6 pgs.).

* cited by examiner

CONTROL METHOD, APPARATUS, AND SYSTEM OF A COMPOSITE ROBOT

CROSS-REFERENCE TO RELATED APPLICATION(S)

This is a national stage application filed under 37 U.S.C. 371 based on International Patent Application No. PCT/CN2022/111062, filed on Aug. 9, 2022, which claims priority to Chinese Patent Application No. 202111209630.6 filed with the China National Intellectual Property Administration (CNIPA) on Oct. 18, 2021, the disclosures of which are incorporated herein by reference in their entireties.

This application claims priority to Chinese Patent Application No. 202111209630.6 filed with the China National Intellectual Property Administration (CNIPA) on Oct. 18, 2021, the disclosure of which is incorporated herein by reference in its entirety.

TECHNICAL FIELD

The present application relates to the field of intelligent control technology, for example, a control method, apparatus, and system of a composite robot.

BACKGROUND

As a representative of the new generation of robots, a composite robot combines the advantages of industrial, mobile, and collaborative robots, and the composite robot is good human-machine cooperation, safe and easy to use, sensitive, precise, flexible, and versatile. Composite robots have changed the working mode of traditional robots. Composite robots have broad application prospects in industrial production, social services, rehabilitation medicine, special operations, and other fields and have become an important direction leading the development of future robots. In rehabilitation medicine, many cases or products use a robot in place of a massagist to perform massage. However, a mainstream composite robot tends to control a robot arm and a mobile chassis separately, not giving full play to the performance advantage of the composite robot and limiting the application of a massage robot. In the force-position composite control of a composite robot, a task space is divided into a position control subspace and a force control subspace. A position and a force cannot be controlled in any given direction, so generally force control is performed in the vertical plane direction, and position control is performed in the tangential plane direction, making it inconvenient for a person to freely pull the composite robot.

SUMMARY

The present application provides a control method of a composite robot. The method is applied to a controller in a robot arm of the composite robot. The robot arm is mounted on a motion mechanism. A force sensor is mounted on the robot arm. The controller is communicatively connected to the motion mechanism. The method includes acquiring multiple forces and multiple torques collected by the force sensor in the current motion when the robot arm is pulled to move; calculating multiple displacement value sets according to the multiple forces, the multiple torques, a preset desired force, a preset desired torque, and a preset model, where each of the multiple displacement value sets includes a first displacement value corresponding to the robot arm and a second displacement value corresponding to the motion mechanism, and the preset model includes an admittance model or an impedance model; calculating the optimal solution according to the multiple displacement value sets to obtain a first target displacement value corresponding to the robot arm and a second target displacement value corresponding to the motion mechanism; controlling the robot arm to move according to the first target displacement value and controlling the motion mechanism to move according to the second target displacement value; and repeating the operation of acquiring multiple forces and multiple torques collected by the force sensor in the current motion until the robot arm and the motion mechanism stop moving.

The present application also provides a control apparatus of a composite robot. The apparatus is applied to a controller in a robot arm of the composite robot. The robot arm is mounted on a motion mechanism. A force sensor is mounted on the robot arm. The controller is communicatively connected to the motion mechanism. The apparatus includes a torque acquisition module, a displacement calculation module, a target displacement determination module, a motion control module, and a cycling module.

The torque acquisition module is configured to acquire multiple forces and multiple torques collected by the force sensor in the current motion when the robot arm is pulled to move.

The displacement calculation module is configured to calculate multiple displacement value sets according to the multiple forces, the multiple torques, a preset desired force, a preset desired torque, and a preset model, where each of the multiple displacement value sets includes a first displacement value corresponding to the robot arm and a second displacement value corresponding to the motion mechanism, and the preset model includes an admittance model or an impedance model.

The target displacement determination module is configured to calculate the optimal solution according to the multiple displacement value sets to obtain a first target displacement value corresponding to the robot arm and a second target displacement value corresponding to the motion mechanism.

The motion control module is configured to control the robot arm to move according to the first target displacement value and control the motion mechanism to move according to the second target displacement value.

The cycling module is configured to repeat the operation of acquiring multiple forces and multiple torques collected by the force sensor in the current motion until the robot arm and the motion mechanism stop moving.

The present application also provides a control system of a composite robot. The system includes a composite robot and a massage platform. The composite robot is communicatively connected to the massage platform. The composite robot includes a robot arm and a motion mechanism. A controller and a force sensor are mounted in the robot arm. The robot arm is mounted on the motion mechanism. The controller is communicatively connected to the motion mechanism. The controller is configured to perform the preceding control method of the composite robot.

The present application also provides a computer-readable storage medium storing computer-executable instructions which, when called and executed by a processor, cause the processor to perform the preceding control method of the composite robot.

DETAILED DESCRIPTION

The solution of the present application is described hereinafter in conjunction with embodiments. These embodiments are part of embodiments of the present application.

A mainstream composite robot or a mobile robot arm usually controls the robot arm and a mobile chassis independently of each other, not giving full play to the performance advantage of the composite robot and thus limiting the application of a massage robot. In the force-position composite control of the composite robot, a task space is divided into a position control subspace and a force control subspace. Neither a position nor a force can be controlled in any given direction; therefore, generally force control is performed in the vertical plane direction, and position control is performed in the tangential plane direction. The force-position composite control method omits dynamic coupling between the robot arm and the environment, making it inconvenient for a person to pull the composite robot freely.

Embodiments of the present application provide a control method, apparatus, and system of a composite robot, enabling dynamic coupling between a robot arm and a motion mechanism. When the composite robot is pulled, flexible following of the robot can be achieved using only a small force, and the pulling effect is more in line with the interaction requirements of the human and the composite robot.

To facilitate understanding of embodiments of the present application, a control method of a composite robot of an embodiment of the present application is described first.

An embodiment of the present application provides a control method of a composite robot. The method is applied to a controller in a robot arm of the composite robot. The robot arm is mounted on a motion mechanism. A force sensor is mounted on the robot arm. The controller is communicatively connected to the motion mechanism. A six-dimensional force sensor is mounted at an end of the robot arm. The motion mechanism may be an automated guided vehicle (AGV) platform.

Figure 1:
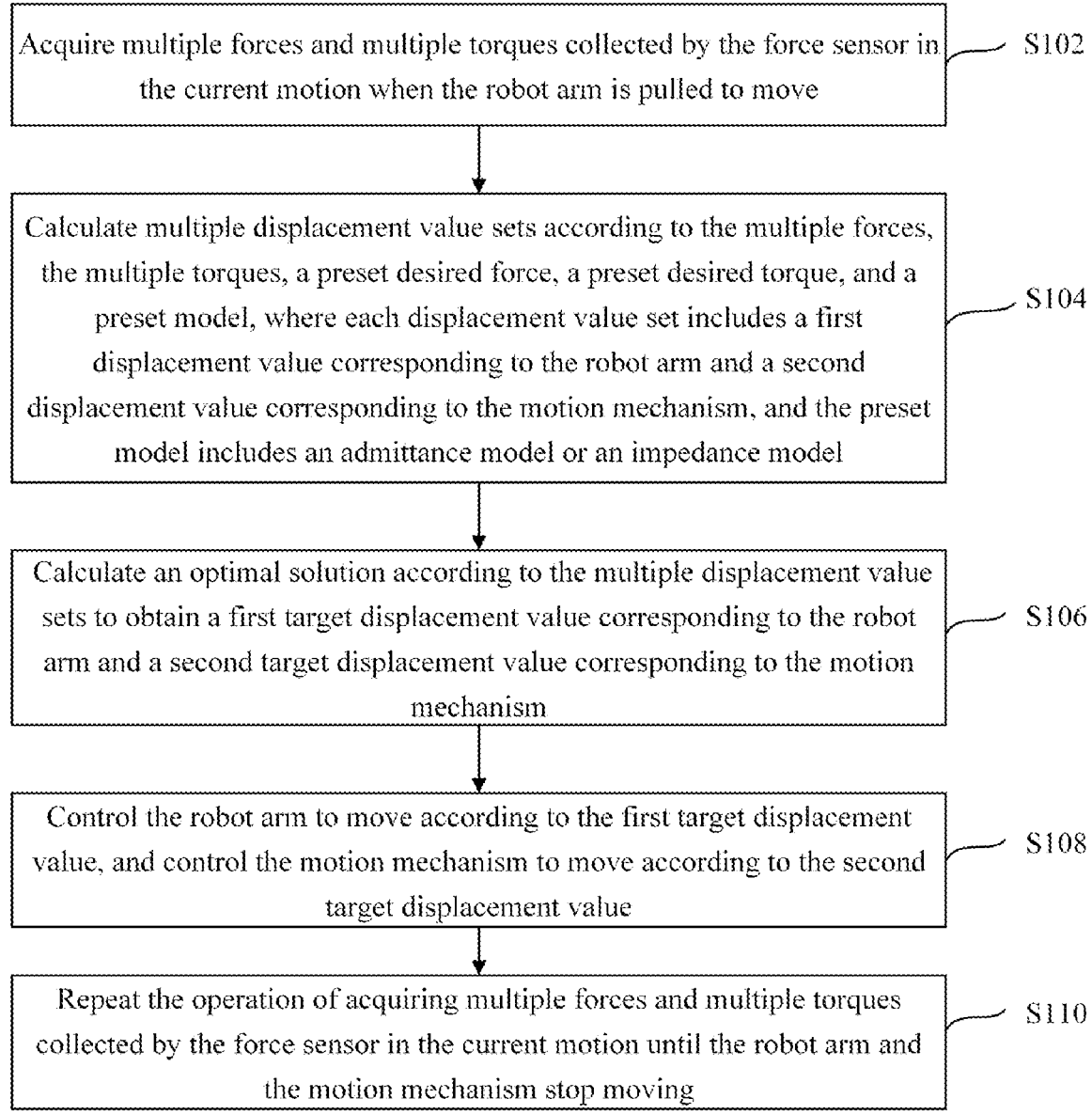
FIG. 1 is a flowchart of a control method of a composite robot according to an embodiment of the present application.

Referring to FIG. 1, the control method of the composite robot includes the following steps:

In S102, multiple forces and multiple torques collected by the force sensor in the current motion are acquired when the robot arm is pulled to move.

The force sensor includes a six-dimensional sensor mounted at an end of the robot arm or a joint sensor mounted at each joint of the robot arm. When the six-dimensional sensor mounted at the end of the robot arm is used and when the robot arm is pulled to move, the six-dimensional sensor can accurately measure forces and torques at six degrees of freedom, that is, forces in three translational degrees of freedom x, y, and z of the robot arm and torques in three rotational degrees of freedom rx, ry, and rz of the robot arm.

In S104, multiple displacement value sets are calculated according to the multiple forces, the multiple torques, a preset desired force, a preset desired torque, and a preset model, where each of the multiple displacement value sets includes a first displacement value corresponding to the robot arm and a second displacement value corresponding to the motion mechanism, and the preset model includes an admittance model or an impedance model.

Figure 2:
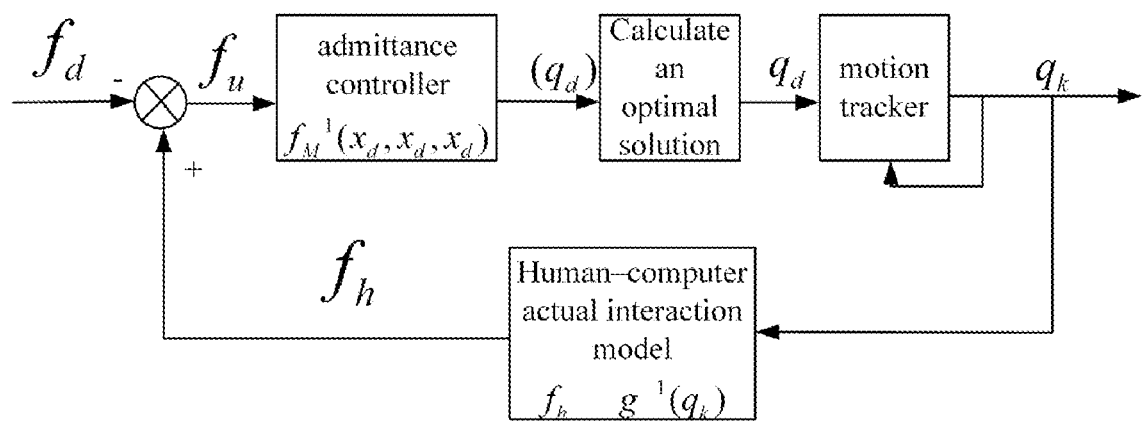
FIG. 2 is a diagram illustrating the structure of an admittance control system according to an embodiment of the present application.

When the preset model is an admittance model and when the force sensor is a six-dimensional sensor, the multiple forces and the multiple torques include a force corresponding to each of three translational degrees of freedom among six degrees of freedom and a torque corresponding to each of three rotational degrees of freedom among the six degrees of freedom. Referring to FIG. 2, $f_d$ denotes a preset desired force or torque, $f_h$ denotes an actually received force or torque, and $f_u$ denotes a force or torque deviation value.

Calculating the multiple displacement value sets according to the multiple forces, the multiple torques, the preset desired force, the preset desired torque, and the preset model includes determining a force or torque deviation value according to the force corresponding to each of the three translational degrees of freedom among the six degrees of freedom, the torque corresponding to each of the three rotational degrees of freedom among the six degrees of freedom, the preset desired force, and the preset desired torque; inputting the force or torque deviation value into the admittance model and calculating a solution according to the input force or torque deviation value to obtain an admittance-controlled displacement value set; and calculating an inverse solution according to the force corresponding to each of the three translational degrees of freedom among the six degrees of freedom, the torque corresponding to each of the three rotational degrees of freedom among the six degrees of freedom, and the admittance-controlled displacement value set to obtain the multiple displacement value sets $\Phi(q_d)$. $\Phi(q_d)$ is an inverse solution set calculated according to an admittance-controlled displacement value set. The admittance-controlled displacement value set includes a first admittance-controlled displacement value corresponding to the robot arm and a second admittance-controlled displacement value corresponding to the motion mechanism.

The admittance model is as follows:

$$M\ddot{x}_d + B\dot{x}_d + Kx_d = f$$

$$\ddot{x}_d = M^{-1}(f - B\dot{x}_d - Kx_d)$$

In the formulas, M denotes an inertia coefficient, K denotes a stiffness coefficient, B denotes a damping coefficient, f denotes a deviation value between a desired force or torque of the human and the composite robot and the actual force or torque of the human and the composite robot, $x_d$ denotes an admittance-controlled displacement value, $\dot{x}_d$ denotes a first derivative of the admittance-controlled displacement value, and $\ddot{x}_d$ denotes a second derivative of the admittance-controlled displacement value.

When the handle below the force sensor is pulled, the admittance model outputs target acceleration according to the set inertia coefficient, stiffness coefficient, and damping coefficient; calculates the target speed and position, that is, an admittance-controlled displacement value set, according to the current speed and position acquired by the AGV sensor; and then calculates an inverse solution according to the admittance-controlled displacement value set to obtain a first displacement value corresponding to the robot arm and a second displacement value corresponding to the motion mechanism included in each of the multiple displacement value sets.

In S106, an optimal solution is calculated according to the multiple displacement value sets so that a first target displacement value corresponding to the robot arm and a second target displacement value corresponding to the motion mechanism are obtained.

The AGV and the six-degree-of-freedom robot arm have a total of nine degrees of freedom, and there are multiple inverse solution sets; therefore, it is required to limit the range of motion and use an optimization algorithm to obtain an optimal solution to determine the motion of the robot arm and the motion of the AGV. As shown in FIG. 2, $q_d$ denotes the optimal solution obtained using the optimization algorithm. The step of calculating the optimal solution includes acquiring a current kinematics parameter and a force-related parameter (for example, displacement-speed-acceleration of the AGV, displacement-speed-acceleration at the end of the robot arm, and six degrees of freedom at the end of the robot arm: x, y, z and rx, ry, rz); determining a screening condition according to the current kinematics parameter and the force-related parameter; and selecting a displacement value satisfying the screening condition from among the multiple displacement value sets to serve as a target displacement value, where the target displacement value includes the first target displacement value corresponding to the robot arm and the second target displacement value corresponding to the motion mechanism.

To calculate the optimal solution is to obtain a solution that satisfies a condition that is imposed on each solution. This condition is determined by a kinematics parameter and a received force in each state. For example, at the beginning or end of pulling, the robot arm is pulled first, and the AGV is substantially immobile when the displacement of the robot arm relative to the AGV is not large enough or when the force received by the robot arm is relatively small; and in the pulling phase, that is, when the force received by the robot arm does not change greatly, it is first practice that the position of the AGV relative to the end of the robot arm does not change. In this embodiment, the influence weights of the forces or torques at six degrees of freedom may be adjusted.

In S108, the robot arm is controlled to move according to the first target displacement value, and the motion mechanism is controlled to move according to the second target displacement value.

A first position controller is mounted in the robot arm; a second position controller is mounted in the motion mechanism; and the following operations are performed: sending a first control signal to the first position controller according to the first target displacement value to enable the first position controller to control the robot arm to move according to the first control signal; and sending a second control signal to the second position controller according to the second target displacement value to enable the second position controller to control the motion mechanism to move according to the second control signal.

After the target displacement value of the robot arm and the target displacement value of the AGV are obtained, the robot arm and the AGV receive their respective control signals and are controlled to move by their respective controllers. As shown in FIG. 2, $q_k$ denotes the actual track of each joint of the robot arm and the actual track of the AGV output by a motion tracker.

In S110, the operation of acquiring multiple forces and multiple torques collected by the force sensor in the current motion is repeated until the robot arm and the motion mechanism stop moving.

As shown in FIG. 2, assuming that the preset desired force or torque $f_d$ is 0, when the robot arm is pulled, if the actually received force or torque $f_h$ collected by the sensor of an actual interaction model of the human and the composite robot is not 0, then the force or torque deviation value $f_u$ is not 0 either. Using the force or torque deviation value $f_u$ as input, an admittance controller outputs multiple displacement value sets $\Phi(q_d)$ and calculates an optimal solution of the displacement values of the robot arm and the motion mechanism; and the position controller in the robot arm and the position controller in the AGV control the robot arm and the motion mechanism to move until the robot arm and the motion mechanism are pulled to a desired position. When the robot arm and the motion mechanism stop being pulled, $f_h$ is equal to 0, and the force or torque deviation value $f_u$ is also 0, that is, the input of the admittance controller is 0, and the robot arm and the motion mechanism stop moving.

When the composite robot is pulled, flexible following of the robot can be achieved using only a small force. Additionally, the solution obtained by the optimization algorithm makes it possible that when the robot arm and the AGV are pulled, if the robot arm is stretched to a small degree, the robot arm moves substantially while the AGV moves slightly; and if the robot arm is stretched to a sufficient degree, the robot arm moves slightly while the AGV moves substantially. This effect is more in line with the interaction requirements of the human and the composite robot.

Admittance control parameters at six degrees of freedom may be set separately. In this manner, pulling effects are different in different directions. In practical use, the parameter settings are flexible. For example, one degree of freedom of the AGV may be not open, and pulling of the robot arm may also be not open (the robot arm is fixed).

The control method of the composite robot of this embodiment of the present application can acquire multiple forces and multiple torques collected by the force sensor in the current motion; calculate multiple displacement value sets according to a preset desired force, a preset desired torque, and a preset model; calculate the optimal solution according to the multiple displacement value sets to obtain target displacement values corresponding to the robot arm and the motion mechanism; control the robot arm and the motion mechanism to move; and repeat the preceding operation until the robot arm and the motion mechanism stop moving. The method enables dynamic coupling between the robot arm and the motion mechanism. With the method, when the composite robot is pulled, flexible following of the robot can be achieved using only a small force. Moreover, it is inconvenient for a person to freely pull the composite robot. Additionally, the target displacement value obtained by the optimization algorithm makes it possible that when the robot arm and the motion mechanism are pulled, if the robot arm is stretched to a small degree, the robot arm moves substantially while the motion mechanism moves slightly; and if the robot arm is stretched to a sufficient degree, the robot arm moves slightly while the motion mechanism moves substantially. This effect is more in line with the interaction requirements of the human and the composite robot.

An embodiment of the present application provides an implementation method of a massage technique of a composite robot. The method is implemented based on the force control function of the force sensor of a robot arm of the composite robot.

The controller of the robot arm is communicatively connected to a massage platform. A respective press parameter corresponding to each of multiple massage techniques is configured in the massage platform. The press parameter includes the magnitude of force and the speed of switching. The controller receives a target press parameter sent by the massage platform; and controls a manner in which the robot arm presses a massaged person according to the target press parameter and the force sensor to implement a target massage technique corresponding to the target press parameter.

The multiple massage techniques include at least one of finger pointing, finger pressing, finger pushing, elbow pushing, palm pushing, or massage with one finger.

In regard to different massage techniques, kinematics description and dynamics description of a massage technique may be converted into corresponding force control requirement description, different press parameters may be set according to different force control requirements, and the implementation priority level of the technique and a body part where the technique is to be implemented may be set. In this regard, examples are as follows:

The kinematics description of the finger pointing, the finger pressing, and the elbow pointing is as follows: An up-and-down motion is performed vertically at a fixed position of the surface of a human body. The dynamics description of the finger pointing, the finger pressing, and the elbow pointing is as follows: Being vertical to the surface of the human body is maintained.

Two steps: a "press" step and a "withdraw" step are included. In the "press" step, the human body is gradually approached, the surface of the human body is contacted, and linearly increasing pressure/intensity of pressure (calculated using N or N/cm^2) (including starting pressure, linear increase coefficient, and ending pressure) is output. In the "withdraw" step, the human body is gradually kept away, and linearly decreasing pressure/intensity of pressure (including starting pressure, linear decrease coefficient, and ending pressure) is output. The corresponding force control requirement description is as follows: (1) a pose of the robot arm is maintained to be vertical to the surface of the human body (along the direction of a normal vector of the surface of the human body), (2) normal 6-dimensional force information is fed back in real time, (3) in the process of contacting the human body, changes in the softness of human tissue are fed back in real time, and (4) according to the starting pressure, change coefficient, ending pressure, and softness of the human body, the pose of the robot arm is continuously adjusted, and a linearly changing strength is output. The safety requirement is to ensure that the pressure is less than the maximum bearing capacity of the human body. The implementation priority level of this technique may be set to 1. Body parts where this technique is to be implemented may be set to back, waist, and hips.

The kinematics description of the finger pushing, the elbow pushing, and the palm pushing is as follows: A uniform linear motion is performed in a fixed path on the surface of a human body. An angle is kept relative to the surface of the human body. Three steps: a "press" step, a "push" step, and a "withdraw" step are included. The dynamics description of the finger pushing, the elbow pushing, and the palm pushing is as follows: in the "press" step, the human body is gradually approached, the surface of the human body is contacted, and linearly increasing pressure/intensity of pressure (calculated using N or N/cm^2) (including starting pressure, linear increase coefficient, and ending pressure) is output; and this pressure is maintained. In the "push" step, constant pushing force (including starting force, change system, and target force) is output along a push path while a downward pressure is maintained. In the "withdraw" step, the human body is gradually kept away, and linearly decreasing pressure (including starting pressure, linear decrease coefficient, and ending pressure) is output. The corresponding force control requirement description is as follows: (1) the pose of the robot arm is kept an angle from the surface of the human body, (2) normal 6-dimensional force information is fed back in real time, (3) in the process of contacting the human body, changes in the softness of human tissue are fed back in real time, (4) according to the starting pressure, change coefficient, ending pressure, and softness of the human body, the pose of the robot arm is continuously adjusted, and a linearly changing strength is output, and (5) constant force (including starting force, change system, and target force) is maintained along the push path. The safety requirement is to ensure that the pressure is less than the maximum bearing capacity of the human body. The implementation priority level of this technique may be set to 2. Body parts where this technique is to be implemented may be set to back, waist, and hips.

The kinematics description of massage with one finger is as follows: Reciprocating turning is performed along the vertical axis at a fixed position on the surface of a human body, where the angle range of forward rotation and reverse rotation is 120-180 degrees. The dynamics description of massage with one finger is as follows: Being vertical to the surface of the human body is maintained. Three steps: a "press" step, a "turn" step, and a "withdraw" step are included. In the "press" step, the human body is gradually approached, the surface of the human body is contacted, and linearly increasing pressure/intensity of pressure (calculated using N or N/cm^2) (including starting pressure, linear increase coefficient, and ending pressure) is output; and this pressure is maintained. In the "turn" step, while a downward pressure is maintained, turning is performed along the axis vertical to the surface of the human body, a linearly changing torque (including starting torque, change (increase or decrease) coefficient, and target torque) is output, and being constant is maintained after the target torque is reached. In the "withdraw" step, the human body is gradually kept away, and linearly decreasing pressure (including starting pressure, linear decrease coefficient, and ending pressure) is output. The corresponding force control requirement description is as follows: (1) the pose of the robot arm is maintained to be vertical to the surface of the human body (along the direction of a normal vector of the surface of the human body), (2) normal 6-dimensional force information is fed back in real time, (3) in the process of contacting the human body, changes in the softness of human tissue are fed back in real time, (4) according to the starting pressure, change coefficient, ending pressure, and softness of the human body, the pose of the robot arm is continuously adjusted, and a linearly changing strength is output, and (5) turning is performed along the normal axis, and a linearly changing torque is output. The safety requirement is to ensure that the pressure is less than the maximum bearing capacity of the human body. The implementation priority level of this technique may be set to 3. Body parts where this technique is to be implemented may be set to back, waist, and hips.

In regard to the force control function of the robot arm, a damping force (torque) and a constant force (torque) may be configured at six degrees of freedom. The magnitude of a massage force can be changed by simply a change in a force control parameter. Additionally, in conventional massage, one technique is different from another, and the preferred magnitude of a massage force varies with person. A real-time adjustment of a force control parameter enables the massage technique used by the robot to be closer to that used by a massagist. Moreover, the design of a safety plane ensures the safety of robot massage.

Additionally, the track of the robot arm at the time of massage is substantially determined by a series of poses in the Cartesian space. Various functions can be implemented after a pose set is recorded, edited, and reproduced. Therefore, a software development kit (SDK) of the composite robot may be used to freely adjust, splice, and resize multiple track segments so that a complex massage technique can be easily reproduced and can be adjusted according to different massage objects. For example, functions such as manual pulling track recording, track speed editing, force control, and combination and resizing of the track can be achieved. A user may record the track and adjust a force parameter to reproduce a complex technique or may use predesigned track and techniques such as finger pressing, finger pushing, and finger turning. The preceding SDK focuses on function design that may be performed by a collaborative robot.

In the implementation method of a massage technique of the composite robot of this embodiment of the present application, a respective press parameter corresponding to each massage technique is configured in the controller of the robot arm, the controller receives a target press parameter sent by the massage platform, and the manner in which the robot arm presses a massaged person is controlled according to the target press parameter and the force sensor to implement a target massage technique corresponding to the target press parameter. In this method, the strength of massage varies with a force control parameter so that when the robot performs massage, the massage technique used by the robot is closer to that used by a massagist, and the safety is assured.

Figure 3:
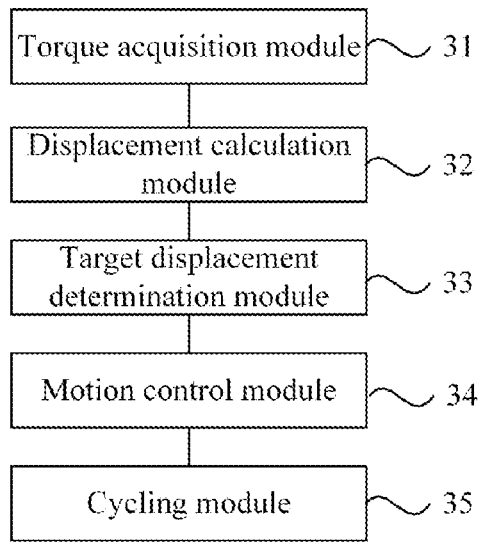
FIG. 3 is a block diagram of a control apparatus of a composite robot according to an embodiment of the present application.

Based on the preceding method embodiment, an embodiment of the present application provides a control apparatus of a composite robot. Referring to FIG. 3, the apparatus is applied to a controller in a robot arm of the composite robot, the robot arm is mounted on a motion mechanism, a force sensor is mounted on the robot arm, the controller is communicatively connected to the motion mechanism, and the apparatus includes a torque acquisition module, a displacement calculation module, a target displacement determination module, a motion control module, and a cycling module.

The torque acquisition module 31 is configured to acquire multiple forces and multiple torques collected by the force sensor in the current motion when the robot arm is pulled to move. The displacement calculation module 32 is configured to calculate multiple displacement value sets according to the multiple forces, the multiple torques, a preset desired force, a preset desired torque, and a preset model, where each of the multiple displacement value sets includes a first displacement value corresponding to the robot arm and a second displacement value corresponding to the motion mechanism, and the preset model includes an admittance model or an impedance model. The target displacement determination module 33 is configured to calculate the optimal solution according to the multiple displacement value sets to obtain a first target displacement value corresponding to the robot arm and a second target displacement value corresponding to the motion mechanism. The motion control module 34 is configured to control the robot arm to move according to the first target displacement value and control the motion mechanism to move according to the second target displacement value. The cycling module 35 is configured to repeat the operation of acquiring multiple forces and multiple torques collected by the force sensor in the current motion until the robot arm and the motion mechanism stop moving.

The control apparatus of the composite robot of this embodiment of the present application can acquire multiple forces and multiple torques collected by the force sensor in the current motion; calculate multiple displacement value sets according to a preset desired force, a preset desired torque, and a preset model; calculate the optimal solution according to the multiple displacement value sets to obtain target displacement values corresponding to the robot arm and the motion mechanism; control the robot arm and the motion mechanism to move; and repeat the preceding operation until the robot arm and the motion mechanism stop moving. The apparatus enables dynamic coupling between the robot arm and the motion mechanism. With the apparatus, when the composite robot is pulled, flexible following of the robot can be achieved using only a small force, and the pulling effect is more in line with the interaction requirements of the human and the composite robot.

The force sensor includes a six-dimensional sensor mounted at an end of the robot arm or a joint sensor mounted at each joint of the robot arm. The preset model includes an admittance model. The force sensor is a six-dimensional sensor. The multiple forces and the multiple torques include a force corresponding to each of three translational degrees of freedom among six degrees of freedom and a torque corresponding to each of three rotational degrees of freedom among the six degrees of freedom.

The displacement calculation module 32 is configured to determine a force or torque deviation value according to the force corresponding to each of three translational degrees of freedom among the six degrees of freedom, the torque corresponding to each of three rotational degrees of freedom among the six degrees of freedom, the preset desired force, and the preset desired torque; input the force or torque deviation value into the admittance model and calculate a solution according to the input force or torque deviation value to obtain an admittance-controlled displacement value set; and calculate an inverse solution according to the force corresponding to each of three translational degrees of freedom among the six degrees of freedom, the torque corresponding to each of three rotational degrees of freedom among the six degrees of freedom, and the admittance-controlled displacement value set to obtain the multiple displacement value sets.

The target displacement determination module 33 is configured to acquire a current kinematics parameter and a force-related parameter; determine a screening condition according to the current kinematics parameter and the force-related parameter; and select a displacement value satisfying the screening condition from among the multiple displacement value sets to serve as a target displacement value, where the target displacement value includes the first target displacement value corresponding to the robot arm and the second target displacement value corresponding to the motion mechanism.

A first position controller is mounted in the robot arm, a second position controller is mounted in the motion mechanism, and the motion control module 34 is configured to send a first control signal to the first position controller according to the first target displacement value to enable the first position controller to control the robot arm to move according to the first control signal; and send a second control signal to the second position controller according to the second target displacement value to enable the second position controller to control the motion mechanism to move according to the second control signal.

The controller is communicatively connected to a massage platform, a respective press parameter corresponding to each of multiple massage techniques is configured in the massage platform, the press parameter includes the magnitude of force and the speed of switching, and the apparatus also includes a massage module configured to receive a target press parameter sent by the massage platform; and control a manner in which the robot arm presses a massaged person according to the target press parameter and the force sensor to implement a target massage technique corresponding to the target press parameter.

The multiple massage techniques include at least one of finger pointing, finger pressing, finger pushing, elbow pushing, palm pushing, or massage with one finger.

The implementation principles and effects of the control apparatus of the composite robot of this embodiment of the present application are the same as those of the preceding control method of a composite robot. For a brief description, for what is not described in the embodiment of the control apparatus, see related description in the embodiment of the control method.

Figure 4:
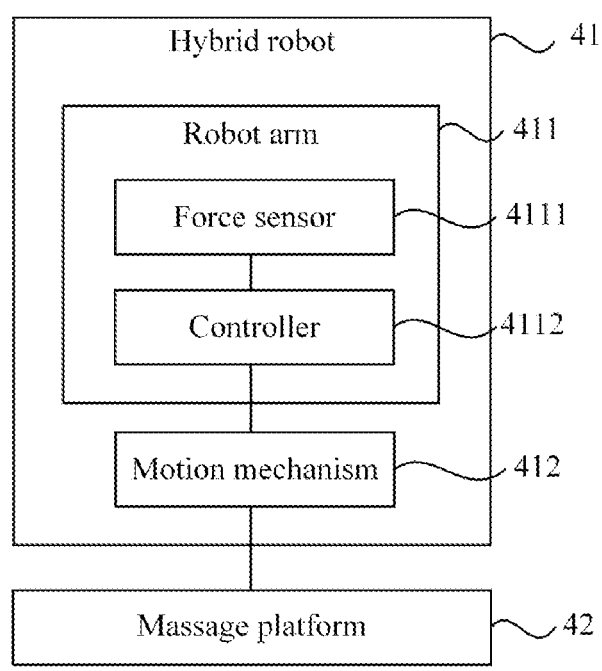
FIG. 4 is a block diagram of a control system of a composite robot according to an embodiment of the present application.

An embodiment of the present application provides a control system of a composite robot. Referring to FIG. 4, the system includes a composite robot 41 and a massage platform 42. The composite robot 41 is communicatively connected to the massage platform 42. The composite robot 41 includes a robot arm 411 and a motion mechanism 412. A controller 4112 and a force sensor 4111 are mounted in the robot arm. The robot arm 411 is mounted on the motion mechanism 412. The controller 4112 is communicatively connected to the motion mechanism 412. The controller 4112 is configured to perform the preceding control method of the composite robot. For details about how the method is performed, see the preceding method embodiment. The details are not repeated here.

The control system of the composite robot of this embodiment of the present application can acquire multiple forces and multiple torques collected by the force sensor in the current motion; calculate multiple displacement value sets according to a preset desired force, a preset desired torque, and a preset model; calculate the optimal solution according to the multiple displacement value sets to obtain target displacement values corresponding to the robot arm and the motion mechanism; control the robot arm and the motion mechanism to move; and repeat the preceding operation until the robot arm and the motion mechanism stop moving. The apparatus enables dynamic coupling between the robot arm and the motion mechanism. With the apparatus, when the composite robot is pulled, flexible following of the robot can be achieved using only a small force, and the pulling effect is more in line with the interaction requirements of the human and the composite robot. Moreover, a massage parameter can be set on a human-computer interface configured on the massage platform. In this system, the strength of massage varies with a force control parameter so that when the robot performs massage, the massage technique used by the robot is closer to that used by a massagist, and the safety is assured.

An embodiment of the present application provides a computer-readable storage medium storing computer-executable instructions which, when called and executed by a processor, cause the processor to perform the preceding control method of the composite robot. For details about how the method is performed, see the preceding method embodiment. The details are not repeated here.

A computer program product of the method, apparatus, and system of embodiments of the present application includes a computer-readable storage medium storing program codes. Instructions included in the program codes may be used for performing the preceding control method of the composite robot. For details about how the method is performed, see the preceding method embodiment. The details are not repeated here.

Unless otherwise stated, relative steps, numerical expressions, and values of components and steps set forth herein do not limit the scope of the present application.

The functions may be stored in a processor-executable non-volatile computer-readable storage medium if implemented in the form of software function units and sold or used as independent products. The solution of the present application may be embodied in the form of a software product. The software product is stored in a storage medium. The software product includes multiple instructions for enabling a computer device (which may be a personal computer, a server, a network device, or another device) to perform all or part of the steps of the method of the preceding embodiment of the present application. The preceding storage medium includes a medium or a non-transitory medium capable of storing program codes, such as a USB flash disk, a mobile hard disk, a read-only memory (ROM), a random-access memory (RAM), a magnetic disk, and an optical disk.

In the description of the present application, orientations or position relations indicated by terms such as "center", "on", "below", "left", "right", "vertical", "horizontal", "inside", and "outside" are based on orientations or position relations shown in the drawings. These orientations or position relations are intended to facilitate and simplify description of the present application and not to indicate or imply that a device or element must have such orientations or must be configured or operated in such orientations. Thus, these orientations or position relations are not to be construed as limiting the present application. Additionally, terms such as "first", "second", and "third" are used for description and not to be construed as indicating or implying relative importance.

What is claimed is:

1. A control method of a composite robot, the method being applied to a controller in a robot arm of the composite robot, the robot arm being mounted on a motion mechanism, a force sensor being mounted on the robot arm, the controller being communicatively connected to the motion mechanism, and the method comprising:
   acquiring a plurality of forces and a plurality of torques collected by the force sensor in a current motion when the robot arm is pulled to move;
   calculating a plurality of displacement value sets according to the plurality of forces, the plurality of torques, a preset desired force, a preset desired torque, and a preset model, wherein each of the plurality of displacement value sets comprises a first displacement value corresponding to the robot arm and a second displacement value corresponding to the motion mechanism, and the preset model comprises an admittance model or an impedance model;
   calculating an optimal solution according to the plurality of displacement value sets to obtain a first target displacement value corresponding to the robot arm and a second target displacement value corresponding to the motion mechanism;
   controlling the robot arm to move according to the first target displacement value and controlling the motion mechanism to move according to the second target displacement value; and repeating the operation of acquiring a plurality of forces and a plurality of torques collected by the force sensor in a current motion until the robot arm and the motion mechanism stop moving;

wherein calculating the optimal solution according to the plurality of displacement value sets to obtain the first target displacement value corresponding to the robot arm and the second target displacement value corresponding to the motion mechanism comprises:

acquiring a current kinematics parameter and a force-related parameter;

determining a screening condition according to the current kinematics parameter and the force-related parameter, wherein the screening condition is determined by a kinematics parameter and a received force in each state, the current kinematics parameter comprises displacement, speed and acceleration of the motion mechanism and displacement, speed and acceleration at the end of the robot arm, the force-related parameter comprises six degrees of freedom at the end of the robot arm, wherein the six degrees of freedom comprise three translational degrees of freedom x, y, and z of the robot arm and three rotational degrees of freedom rx, ry, and rz of the robot arm; and determining a displacement value satisfying the screening condition from among the plurality of displacement value sets as a target displacement value, wherein the target displacement value comprises the first target displacement value corresponding to the robot arm and the second target displacement value corresponding to the motion mechanism.

2. The method of claim 1, wherein the force sensor comprises a six-dimensional sensor mounted at an end of the robot arm or a joint sensor mounted at each joint of the robot arm.

3. The method of claim 1, wherein the preset model comprises the admittance model; the force sensor is a six-dimensional sensor; the plurality of forces and the plurality of torques comprise a force corresponding to each of three translational degrees of freedom among six degrees of freedom and a torque corresponding to each of three rotational degrees of freedom among the six degrees of freedom; and calculating the plurality of displacement value sets according to the plurality of forces, the plurality of torques, the preset desired force, the preset desired torque, and the preset model comprises:

determining a force or torque deviation value according to the force corresponding to the each of the three translational degrees of freedom among the six degrees of freedom, the torque corresponding to the each of the three rotational degrees of freedom among the six degrees of freedom, the preset desired force, and the preset desired torque;

inputting the force or torque deviation value into the admittance model and calculating a solution according to the input force or torque deviation value to obtain an admittance-controlled displacement value set; and according to the force corresponding to the each of the three translational degrees of freedom among the six degrees of freedom, the torque corresponding to the each of the three rotational degrees of freedom among the six degrees of freedom, and the admittance-controlled displacement value set, calculating an inverse solution to obtain the plurality of displacement value sets.

4. The method of claim 1, wherein a first position controller is mounted in the robot arm, a second position controller is mounted in the motion mechanism, and controlling the robot arm to move according to the first target displacement value and controlling the motion mechanism according to the second target displacement value comprises:

sending a first control signal to the first position controller according to the first target displacement value to enable the first position controller to control the robot arm to move according to the first control signal; and sending a second control signal to the second position controller according to the second target displacement value to enable the second position controller to control the motion mechanism to move according to the second control signal.

5. The method of claim 1, wherein the controller is communicatively connected to a massage platform, a respective press parameter corresponding to each of a plurality of massage techniques is configured in the massage platform, the press parameter comprises a magnitude of force and a speed of switching, and the method further comprises:

receiving a target press parameter from the massage platform; and controlling a manner in which the robot arm presses a massaged person according to the target press parameter and the force sensor to implement a target massage technique corresponding to the target press parameter.

6. The method of claim 5, wherein the plurality of massage techniques comprise at least one of finger pointing, finger pressing, finger pushing, elbow pushing, palm pushing, or massage with one finger.

7. A control system of a composite robot, comprising a composite robot and a massage platform, wherein the composite robot is communicatively connected to the massage platform, the composite robot comprises a robot arm and a motion mechanism, a controller and a force sensor are mounted in the robot arm, the robot arm is mounted on the motion mechanism, the controller is communicatively connected to the motion mechanism, and the controller is configured to perform:

acquiring a plurality of forces and a plurality of torques collected by the force sensor in a current motion when the robot arm is pulled to move;

calculating a plurality of displacement value sets according to the plurality of forces, the plurality of torques, a preset desired force, a preset desired torque, and a preset model, wherein each of the plurality of displacement value sets comprises a first displacement value corresponding to the robot arm and a second displacement value corresponding to the motion mechanism, and the preset model comprises an admittance model or an impedance model;

calculating an optimal solution according to the plurality of displacement value sets to obtain a first target displacement value corresponding to the robot arm and a second target displacement value corresponding to the motion mechanism;

controlling the robot arm to move according to the first target displacement value and controlling the motion mechanism to move according to the second target displacement value; and repeating the operation of acquiring a plurality of forces and a plurality of torques collected by the force sensor in a current motion until the robot arm and the motion mechanism stop moving;

wherein the controller calculates the optimal solution according to the plurality of displacement value sets to obtain the first target displacement value corresponding to the robot arm and the second target displacement value corresponding to the motion mechanism by:
acquiring a current kinematics parameter and a force-related parameter;
  determining a screening condition according to the current kinematics parameter and the force-related parameter, wherein the screening condition is determined by a kinematics parameter and a received force in each state, the current kinematics parameter comprises displacement, speed and acceleration of the motion mechanism and displacement, speed and acceleration at the end of the robot arm, the force-related parameter comprises six degrees of freedom at the end of the robot arm, wherein the six degrees of freedom comprise three translational degrees of freedom x, y, and z of the robot arm and three rotational degrees of freedom rx, ry, and rz of the robot arm; and
  determining a displacement value satisfying the screening condition from among the plurality of displacement value sets as a target displacement value, wherein the target displacement value comprises the first target displacement value corresponding to the robot arm and the second target displacement value corresponding to the motion mechanism.

8. The control system of claim 7, wherein the force sensor comprises a six-dimensional sensor mounted at an end of the robot arm or a joint sensor mounted at each joint of the robot arm.

9. The control system of claim 7, wherein the preset model comprises the admittance model; the force sensor is a six-dimensional sensor; the plurality of forces and the plurality of torques comprise a force corresponding to each of three translational degrees of freedom among six degrees of freedom and a torque corresponding to each of three rotational degrees of freedom among the six degrees of freedom; and
  the controller calculates the plurality of displacement value sets according to the plurality of forces, the plurality of torques, the preset desired force, the preset desired torque, and the preset model by:
    determining a force or torque deviation value according to the force corresponding to the each of the three translational degrees of freedom among the six degrees of freedom, the torque corresponding to the each of the three rotational degrees of freedom among the six degrees of freedom, the preset desired force, and the preset desired torque;
    inputting the force or torque deviation value into the admittance model and calculating a solution according to the input force or torque deviation value to obtain an admittance-controlled displacement value set; and
    according to the force corresponding to the each of the three translational degrees of freedom among the six degrees of freedom, the torque corresponding to the each of the three rotational degrees of freedom among the six degrees of freedom, and the admittance-controlled displacement value set, calculating an inverse solution to obtain the plurality of displacement value sets.

10. The control system of claim 7, wherein a first position controller is mounted in the robot arm, a second position controller is mounted in the motion mechanism, and the controller controls the robot arm to move according to the first target displacement value and controlling the motion mechanism according to the second target displacement value by:
  sending a first control signal to the first position controller according to the first target displacement value to enable the first position controller to control the robot arm to move according to the first control signal; and
  sending a second control signal to the second position controller according to the second target displacement value to enable the second position controller to control the motion mechanism to move according to the second control signal.

11. The control system of claim 7, wherein the controller is communicatively connected to the massage platform, a respective press parameter corresponding to each of a plurality of massage techniques is configured in the massage platform, the press parameter comprises a magnitude of force and a speed of switching, and the controller is further configured to perform:
  receiving a target press parameter from the massage platform; and
  controlling a manner in which the robot arm presses a massaged person according to the target press parameter and the force sensor to implement a target massage technique corresponding to the target press parameter.

12. The control system of claim 11, wherein the plurality of massage techniques comprise at least one of finger pointing, finger pressing, finger pushing, elbow pushing, palm pushing, or massage with one finger.

13. A non-transitory computer-readable storage medium storing computer-executable instructions which, when called and executed by a processor, cause the processor to perform:
  acquiring a plurality of forces and a plurality of torques collected by a force sensor in a current motion when a robot arm is pulled to move;
  calculating a plurality of displacement value sets according to the plurality of forces, the plurality of torques, a preset desired force, a preset desired torque, and a preset model, wherein each of the plurality of displacement value sets comprises a first displacement value corresponding to the robot arm and a second displacement value corresponding to a motion mechanism, and the preset model comprises an admittance model or an impedance model;
  calculating an optimal solution according to the plurality of displacement value sets to obtain a first target displacement value corresponding to the robot arm and a second target displacement value corresponding to the motion mechanism;
  controlling the robot arm to move according to the first target displacement value and controlling the motion mechanism to move according to the second target displacement value; and
  repeating the operation of acquiring a plurality of forces and a plurality of torques collected by the force sensor in a current motion until the robot arm and the motion mechanism stop moving;
  wherein the processor calculates the optimal solution according to the plurality of displacement value sets to obtain the first target displacement value corresponding to the robot arm and the second target displacement value corresponding to the motion mechanism by:
acquiring a current kinematics parameter and a force-related parameter;
  determining a screening condition according to the current kinematics parameter and the force-related parameter, wherein the screening condition is determined by a kinematics parameter and a received force in each state, the current kinematics parameter comprises displacement, speed and acceleration of the motion mechanism and displacement, speed and acceleration at the end of the robot arm, the force-related parameter comprises six degrees of freedom at the end of the robot arm, wherein the six degrees of freedom comprise three translational degrees of freedom x, y, and z of the robot arm and three rotational degrees of freedom rx, ry, and rz of the robot arm; and determining a displacement value satisfying the screening condition from among the plurality of displacement value sets as a target displacement value, wherein the target displacement value comprises the first target displacement value corresponding to the robot arm and the second target displacement value corresponding to the motion mechanism.

14. The non-transitory computer-readable storage medium of claim 13, wherein the force sensor comprises a six-dimensional sensor mounted at an end of the robot arm or a joint sensor mounted at each joint of the robot arm.

15. The non-transitory computer-readable storage medium of claim 13, wherein the preset model comprises the admittance model; the force sensor is a six-dimensional sensor; the plurality of forces and the plurality of torques comprise a force corresponding to each of three translational degrees of freedom among six degrees of freedom and a torque corresponding to each of three rotational degrees of freedom among the six degrees of freedom; and the processor calculates the plurality of displacement value sets according to the plurality of forces, the plurality of torques, the preset desired force, the preset desired torque, and the preset model by:

determining a force or torque deviation value according to the force corresponding to the each of the three translational degrees of freedom among the six degrees of freedom, the torque corresponding to the each of the three rotational degrees of freedom among the six degrees of freedom, the preset desired force, and the preset desired torque;

inputting the force or torque deviation value into the admittance model and calculating a solution according to the input force or torque deviation value to obtain an admittance- controlled displacement value set; and according to the force corresponding to the each of the three translational degrees of freedom among the six degrees of freedom, the torque corresponding to the each of the three rotational degrees of freedom among the six degrees of freedom, and the admittance-controlled displacement value set, calculating an inverse solution to obtain the plurality of displacement value sets.

16. The non-transitory computer-readable storage medium of claim 13, wherein a first position controller is mounted in the robot arm, a second position controller is mounted in the motion mechanism, and the processor controls the robot arm to move according to the first target displacement value and controlling the motion mechanism according to the second target displacement value by:

sending a first control signal to the first position controller according to the first target displacement value to enable the first position controller to control the robot arm to move according to the first control signal; and sending a second control signal to the second position controller according to the second target displacement value to enable the second position controller to control the motion mechanism to move according to the second control signal.

17. The non-transitory computer-readable storage medium of claim 13, wherein a controller is communicatively connected to a massage platform, a respective press parameter corresponding to each of a plurality of massage techniques is configured in the massage platform, the press parameter comprises a magnitude of force and a speed of switching, and the processor is further configured to perform:

receiving a target press parameter from the massage platform; and controlling a manner in which the robot arm presses a massaged person according to the target press parameter and the force sensor to implement a target massage technique corresponding to the target press parameter.

* * * * *